United States Patent
Chekansky

(10) Patent No.: US 9,523,414 B2
(45) Date of Patent: Dec. 20, 2016

(54) VARIABLE FLOW HYDRAULIC CHAIN TENSIONER

(71) Applicant: BorgWarner Inc., Auburn Hills, MI (US)

(72) Inventor: Jason Chekansky, Asheville, NC (US)

(73) Assignee: BorgWarner, Inc., Auburn Hills, MI (US)

( * ) Notice: Subject to any disclaimer, the term of this patent is extended or adjusted under 35 U.S.C. 154(b) by 182 days.

(21) Appl. No.: 14/375,447

(22) PCT Filed: Jan. 29, 2013

(86) PCT No.: PCT/US2013/023549
§ 371 (c)(1),
(2) Date: Jul. 30, 2014

(87) PCT Pub. No.: WO2013/119412
PCT Pub. Date: Aug. 15, 2013

(65) Prior Publication Data
US 2015/0024886 A1 Jan. 22, 2015

Related U.S. Application Data

(60) Provisional application No. 61/595,407, filed on Feb. 6, 2012.

(51) Int. Cl.
*F16H 7/08* (2006.01)

(52) U.S. Cl.
CPC .............. *F16H 7/08* (2013.01); *F16H 7/0836* (2013.01); *F16H 2007/0806* (2013.01); *F16H 2007/0812* (2013.01); *F16H 2007/0859* (2013.01)

(58) Field of Classification Search
CPC ................ F16H 7/08; F16H 2007/0812; F16H 2007/0806
(Continued)

(56) References Cited

U.S. PATENT DOCUMENTS 5,116,284 A   5/1992   Cho
5,176,581 A   1/1993   Kumm
(Continued)

FOREIGN PATENT DOCUMENTS

CN        201575116        9/2010
EP        1215415 A3       8/2003
(Continued)

*Primary Examiner* — William E Dondero
*Assistant Examiner* — Mark K Buse
(74) *Attorney, Agent, or Firm* — Helmholdt Law PLC; Thomas D. Helmholdt

(57) ABSTRACT

A variable flow hydraulic tensioner (10) for a chain or belt can include a fixed member (12) having a first port (12a), and a movable member (14) in engaged with the fixed member (12). The movable member (14) can include a second port (14a) initially aligned with respect to the first port (12a) to allow fluid flow therethrough. A first spring (16) can bias the movable member (14) with respect to the fixed member (12) to align the first and second ports (12a, 14a) with respect to one another to allow fluid flow therethrough. A second spring (18) can have less spring force than the first spring (16) to bias the movable member (14) in an opposite direction with respect to the fixed member (12), such that as the chain or belt wears, a differential force between the first and second springs (16, 18) diminishes until the movable member (14) moves relative to the fixed member (12) sufficiently to offset the first and second ports (12a, 14a) with respect to one another to prevent fluid flow therethrough.

15 Claims, 3 Drawing Sheets

(58) Field of Classification Search
USPC .................................................. 184/110, 111
See application file for complete search history.

(56) References Cited

U.S. PATENT DOCUMENTS

| | | | |
|---|---|---|---|
| 5,259,820 A | 11/1993 | Mott | |
| 5,277,664 A | 1/1994 | Mott | |
| 5,637,047 A * | 6/1997 | Schulze | F16H 7/0848 474/110 |
| 5,700,213 A * | 12/1997 | Simpson | F16H 7/0848 474/110 |
| 5,707,309 A * | 1/1998 | Simpson | F16H 7/08 474/110 |
| 5,993,342 A * | 11/1999 | Wigsten | F16H 7/08 474/110 |
| 6,053,831 A * | 4/2000 | Boedo | F16H 7/0848 474/109 |
| 6,139,454 A | 10/2000 | Simpson | |
| 6,193,623 B1 * | 2/2001 | Koch | F16H 7/0836 474/110 |
| 6,383,103 B1 * | 5/2002 | Fujimoto | F01L 1/02 474/109 |
| 6,398,682 B1 * | 6/2002 | Suzuki | F16H 7/08 474/110 |
| 6,634,973 B1 * | 10/2003 | Simpson | F16H 7/0848 474/109 |
| 8,021,254 B2 * | 9/2011 | Bulloch | F16H 7/0848 474/109 |
| 8,951,154 B2 * | 2/2015 | Konuma | F16H 7/0848 474/110 |
| 9,062,741 B2 * | 6/2015 | Kurematsu | F16H 7/0848 |
| 9,133,916 B2 * | 9/2015 | Hofmann | F16H 7/0836 |
| 2009/0017949 A1 | 1/2009 | Sato et al. | |

FOREIGN PATENT DOCUMENTS

| | | |
|---|---|---|
| EP | 1022487 B1 | 1/2004 |
| EP | 1215415 B1 | 9/2005 |
| KR | 20060019196 A | 3/2006 |

* cited by examiner

VARIABLE FLOW HYDRAULIC CHAIN TENSIONER

FIELD OF THE INVENTION

An endless loop power transmission system, where a rotatable power input member is in driving contact with an endless loop power transferring member for advancing the endless loop power transferring member along an endless path of travel and a rotatable power output member is engaged with the endless loop power transferring member at a position along the endless path of travel to be driven by the endless loop power transferring member in order to supply power for driving a load, and a load responsive tension adjuster for adjusting tension of the endless loop power transferring member, wherein force for actuating the tension adjuster is derived from exertion of force on a fluid.

BACKGROUND

Hydraulic tensioners are typically used as control devices for endless loop power transferring members, such as chain or belt drives, in an automotive engine timing system. Such endless loop power transferring members provide a driving connection from the crankshaft to the camshafts and to auxiliary devices, such as an oil or fuel pump. During typical operation, the tension in the chain or belt can vary greatly due to the dynamic shaft oscillations which are induced from engine firing, valve train loading, or auxiliary device operation. Moreover, chain or belt components typically wear during prolonged use thereby increasing the length of the chain or belt and decreasing the tension on the chain or belt. A hydraulic tensioner is used to take up the slack in the chain or belt and provide control of the chain or belt oscillations due to tension fluctuations.

Hydraulic tensioners are known from U.S. Pat. Nos. 8,021,254; 6,053,831; 5,277,664; 5,259,820; 5,176,581; 5,116,284; U.S. Published Appl. No. 2009/0017949; CN 201575116; EP 1215415; and EP 1022487. While these devices appear to be suitable for their intended purposes, it would be desirable to provide a variable flow hydraulic chain tensioner. It would also be desirable to provide a variable flow hydraulic chain tensioner with simple mechanical construction allowing lower cost of manufacturing, assembly and installation. A variable flow hydraulic chain tensioner of robust, efficient, and dependable performance is also desirable to be provided.

SUMMARY

A variable flow hydraulic tensioner for an endless loop power transmission member can include a fixed member having at least one fluid flow port extending therethrough, and a movable member in sliding engagement with the fixed member, the movable member having at least one fluid flow port extending therethrough and initially aligned with respect to the at least one fluid flow port of the fixed member to allow flow therethrough. A first spring can have a first spring force for biasing the movable member in a first direction relative to the fixed member creating alignment of the at least one fluid flow port of the fixed and movable members with respect to one another to allow flow therethrough. A second spring can have a second spring force of smaller value than the first spring force for biasing the movable member in a second direction relative to the fixed member, such that as an endless loop power transferring member wears, a differential force between the first and second springs diminishes until the movable member moves relative to the fixed member sufficiently to offset the fluid flow ports with respect to one another and close the at least one fluid flow port extending through the fixed and movable members to prevent flow therethrough.

A variable flow hydraulic tensioner for an endless loop power transmission member can include a body having a stepped bore extending therethrough with an annular shoulder located between a larger diameter bore portion and a smaller diameter bore portion. A fixed member can be located within the larger bore portion. The fixed member can have at least one fluid flow port located extending radially therethrough. A movable member can be located within the larger bore portion and in sliding engagement with the fixed member. The movable member can have at least one fluid flow port located extending radially therethrough and initially aligned longitudinally with respect to the at least one fluid flow port of the fixed member to allow flow therethrough. A first spring can have a first spring force and located within the larger bore portion for biasing the movable member toward the fixed member for aligning the at least one fluid flow port of the fixed and movable members longitudinally with respect to one another to allow flow therethrough. A second spring can have a second spring force of smaller value than the first spring force located within the larger bore portion for biasing the movable member longitudinally away from the fixed member, such that as the endless loop power transmission member wears, a differential spring force between the first and second springs diminishes until the movable member moves longitudinally away from the fixed member sufficiently to offset the radially extending fluid flow ports with respect to one another and close the at least one fluid flow port extending radially through the fixed and movable members to prevent flow therethrough.

In an endless loop power transmission system, where a rotatable power input member is in driving contact with an endless loop power transferring member for advancing the endless loop power transferring member along an endless loop path of travel and a rotatable power output member is engaged with the endless loop power transferring member at a position along the endless loop path of travel to be driven by the endless loop power transferring member in order to supply power for driving a load, and a load responsive tension adjuster for adjusting tension of the endless loop power transferring member, wherein force for actuating the tension adjuster is derived from exertion of force on a fluid, an improvement of the load responsive tension adjuster can include a fixed member having a first port, and a movable member in sliding engagement with the fixed member. The movable member can have a second port initially aligned with respect to the first port to allow fluid flow therethrough. A first spring can be provided for biasing the movable member toward the fixed member to align the first and second ports with respect to one another and allow fluid flow therethrough. A second spring can have less spring force than the first spring to bias the movable member away from the fixed member, such that as the endless loop power transferring member wears, a differential force between the first spring and the second spring diminishes until the movable member moves relative to the fixed member sufficiently to offset the first and second ports with respect to one another to prevent fluid flow therethrough.

The present invention provides a mechanism to vary chain tensioner hydraulic damping. A piston/plunger, slidably fit in a bore, is outwardly biased by a set of springs. The main spring is located between a bore bottom and mating flange of an outer flow device. The secondary spring is located on the adjacent mating flange of the outer flow device, and mating flange of an inner flow device. The spring force balance, in a condition of minimum piston extension, produces a flow device arrangement such that hydraulic venting is permitted by the flow device. As the piston extends out of the bore, the spring force balance becomes such that the outer flow device becomes biased away from the inner flow device, thus closing the flow venting ports and preventing flow communication between the inner and outer flow devices. This results in a hydraulic chain tensioner with increased damping capacity.

It should be recognized that the disclosed structure can be modified to provide an initial configuration where the flow ports are closed, if desired. In this modified configuration, as the chain elongates and the piston and springs extend, the spring force balance changes such that the movable member of the variable flow device moves relative to the fixed member, thereby opening the flow port, resulting in a hydraulic tensioner with decreased damping capacity.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
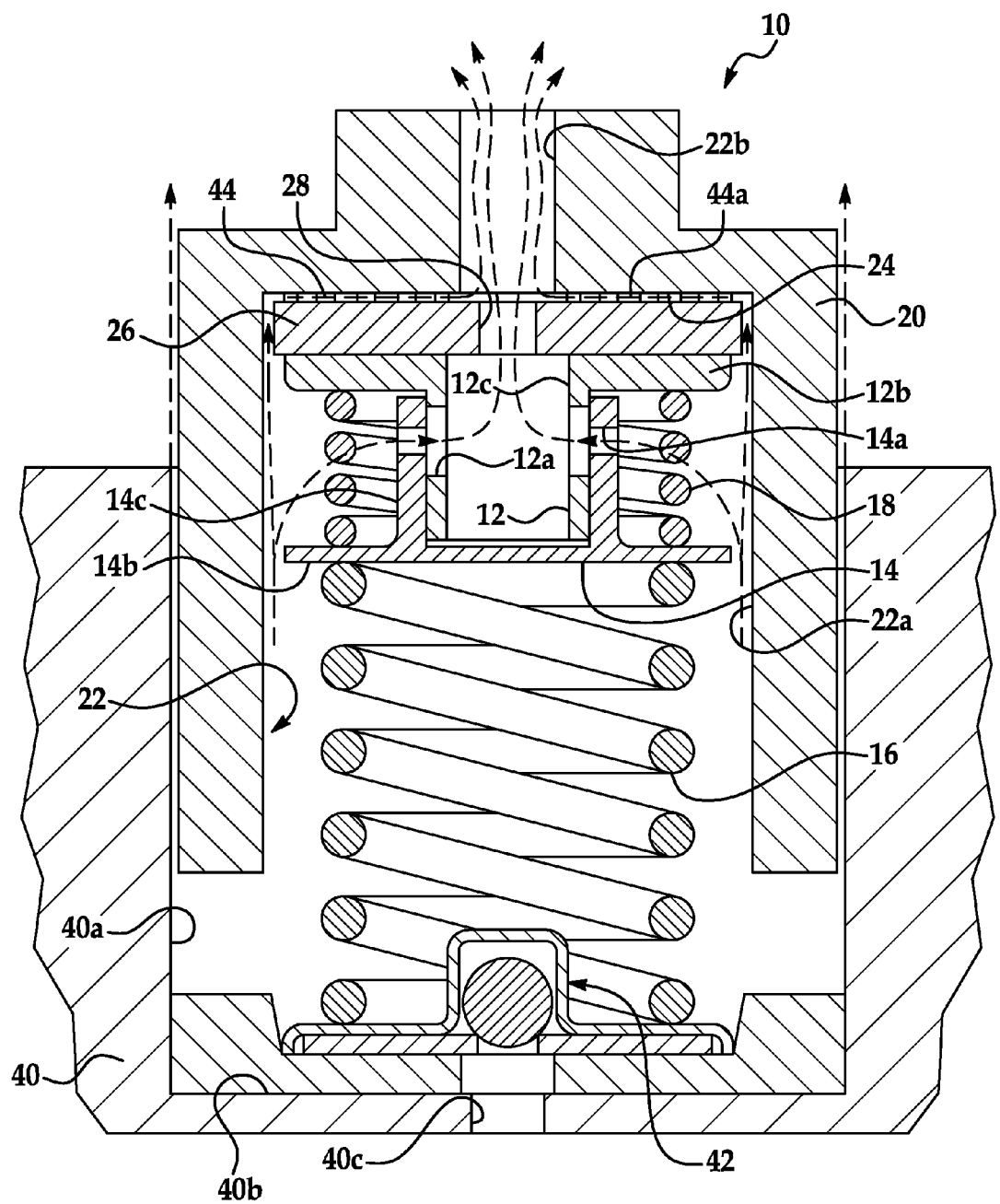
FIG. 1 is a simplified schematic view of a variable stiffness tension adjuster acting in association with a new endless loop power transferring member, where a first spring force is much greater than a second spring force maintaining open flow ports through aligned apertures in slidably engaged members.
Figure 2:
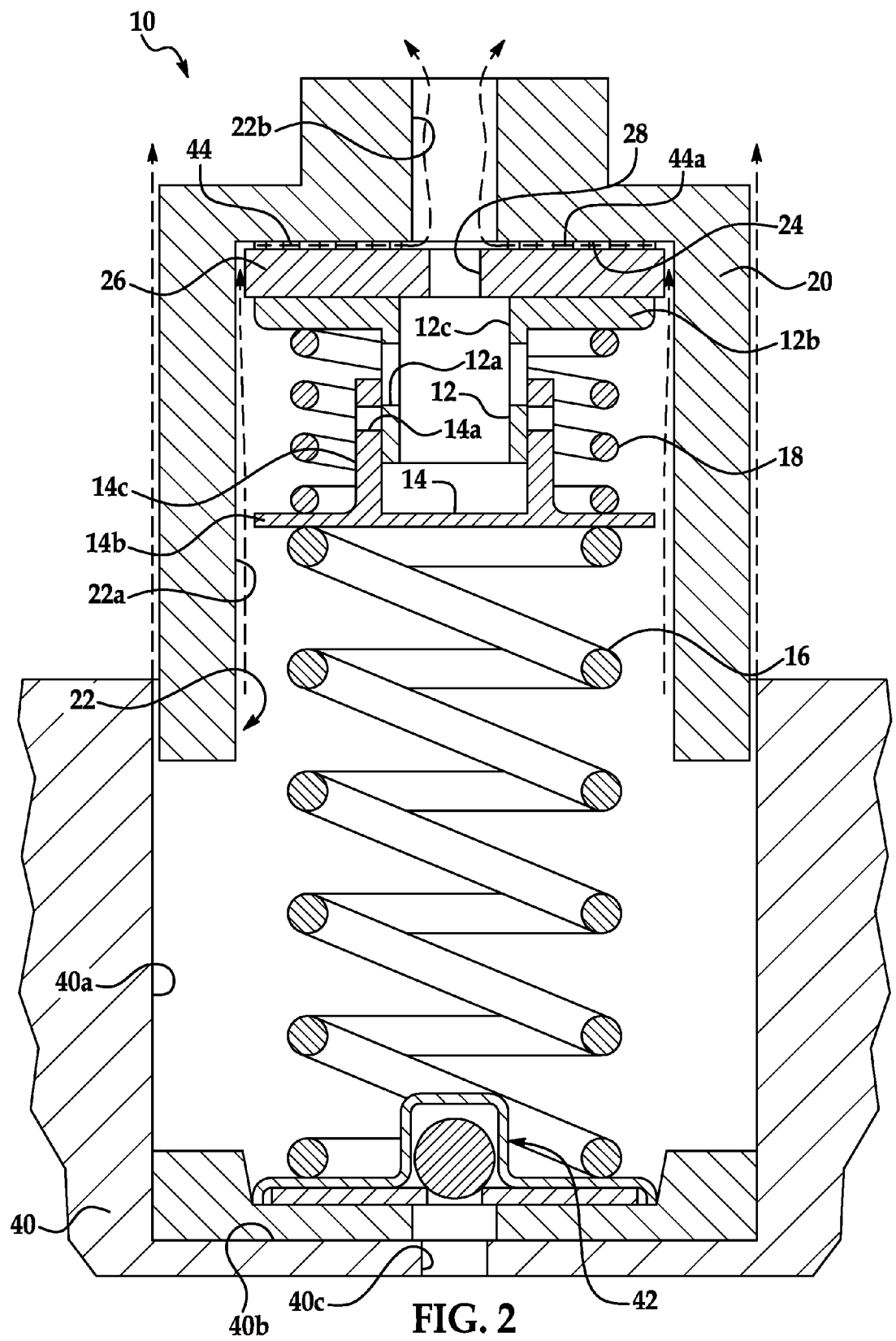
FIG. 2 is a simplified schematic view of the variable stiffness tension adjuster of FIG. 1 acting in association with a worn endless loop power transferring member, where the first spring force is approximately equal to the second spring force resulting in closed flow ports through offset apertures in the slidably engaged members.

Referring now to FIGS. 1-2, a variable flow hydraulic tensioner 10 for an endless loop power transmission member 34 can include a fixed member 12 having at least one fluid flow port 12a extending therethrough. A movable member 14 can be located in sliding engagement with the fixed member 12. The movable member 14 can have at least one fluid flow port 14a extending therethrough and initially aligned with respect to the at least one fluid flow port 12a of the fixed member 12 to allow flow therethrough. A first spring 16 can have a first spring force for biasing the movable member 14 in a first direction relative to the fixed member 12 to create alignment of the at least one fluid flow port 12a, 14a of the fixed and movable members 12, 14 with respect to one another to allow flow therethrough. A second spring 18 can have a second spring force of smaller value than the first spring force for biasing the movable member 14 in a second direction relative to the fixed member 12, such that as an endless loop power transferring member wears, a differential force between the first and second springs 16, 18 diminishes until the movable member 14 moves relative to the fixed member 12 sufficiently to offset the fluid flow ports 12a, 14a with respect to one another and close the at least one fluid flow port 12a, 14a extending through the fixed and movable members 12, 14 to prevent flow therethrough.

The hydraulic tensioner 10 can include a body 20 having a stepped bore 22 extending through the body 20 with an annular shoulder 24 located between a larger diameter bore portion 22a and a smaller diameter bore portion 22b. The fixed member 12, movable member 14, first spring 16 and second spring 18 can be located within the larger bore portion 22a. A vent disk 26 can be located adjacent the annular shoulder 24 of the body, and can have an aperture 28 extending therethrough. The fixed member 12 can be seated against the vent disk 26. The fixed member 12 can have an annular flange portion 12b and a hollow cylindrical portion 12c. The second spring 18 can be seated against the annular flange portion 12b of the fixed member 12. The movable member 14 can have an annular flange portion 14b and a hollow cylindrical portion 14c. The first and second springs 16, 18 can be seated against opposite sides of the annular flange portion 14b of the movable member 14. The hollow cylindrical portion 14c of the movable member 14 can be telescopically engaged with the hollow cylindrical portion 12c of the fixed member 12 to guide movement of the moveable member 14 relative to the fixed member 12.

Figure 3:
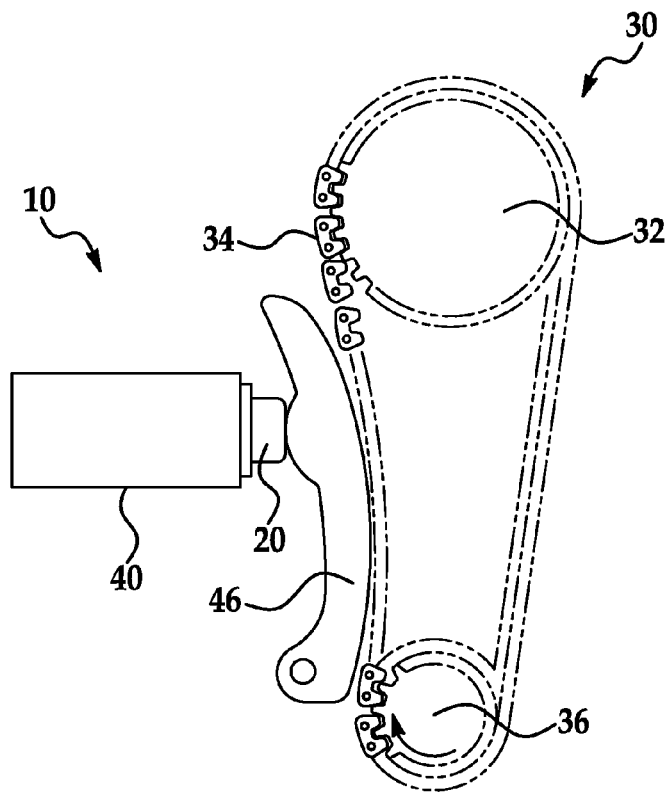
FIG. 3 is a simplified schematic of an endless loop power transmission system, where a rotatable power input member is in driving contact with an endless loop power transferring member for advancing the endless loop power transferring member along an endless loop path of travel and a rotatable power output member is engaged with the endless loop power transferring member at a position along the endless loop path of travel to be driven by the endless loop power transferring member in order to supply power for driving a load, and a load responsive tension adjuster for adjusting tension of the endless loop power transferring member, wherein force for actuating the tension adjuster is derived from exertion of force on a fluid.

Referring now to FIGS. 1-3, in an endless loop power transmission system 30, where a rotatable power input member 32 is in driving contact with an endless loop power transferring member 34 for advancing the endless loop power transferring member 34 along an endless loop path of travel and a rotatable power output member 36 is engaged with the endless loop power transferring member 34 at a position along the endless loop path of travel to be driven by the endless loop power transferring member 34 in order to supply power for driving a load, and a load responsive tension adjuster 10 for adjusting tension of the endless loop power transferring member 34 through a tensioning arm 46, wherein force for actuating the tension adjuster 10 is derived from exertion of force on a fluid, the improvement of the load responsive tension adjuster 10 can include a fixed member 12 having a first port 12a, and a movable member 14 in sliding engagement with the fixed member 12. The movable member 14 can have a second port 14a initially aligned with respect to the first port 12a to allow fluid flow therethrough. A first spring 16 can bias the movable member 14 toward the fixed member 12 to align the first and second ports 12a, 14a with respect to one another and allow fluid flow therethrough. A second spring 18 can have less spring force than the first spring 16 to bias the movable member 14 away from the fixed member 12, such that as the endless loop power transferring member wears, a differential force between the first spring 16 and the second spring 18 diminishes until the movable member 14 moves relative to the fixed member 12 sufficiently to offset the first and second ports 12a, 14a with respect to one another to prevent fluid flow therethrough.

The fixed member 12 can have an annular flange portion 12b and a hollow cylindrical portion 12c. The second spring 18 can be seated against the annular flange portion 12b of the fixed member 12. The movable member 14 can have an annular flange portion 14b and a hollow cylindrical portion 14c. The hollow cylindrical portion 14c of the movable member 14 can be telescopically engaged with the hollow cylindrical portion 12c of the fixed member 12 to guide movement of the moveable member 14 with respect to the fixed member 12. The first and second springs 16, 18 can be seated against opposite sides of the annular flange portion 14b of the movable member 14.

The variable flow hydraulic tensioner 10 provides a mechanism to vary belt or chain tensioner hydraulic damping. A piston 20, slidably fit in a bore 40a of tensioner body 40, is outwardly biased by a set of springs 16, 18. The main spring 16 is located between a bore bottom 40b of the tensioner body 40 and mating flange 14b of an outer flow device, identified as movable member 14. The secondary spring 18 is located on the adjacent mating flange 14b of the outer flow device, identified as movable member 14, and mating flange 12b of an inner flow device, identified as fixed member 12. The spring force balance, in a condition of minimum piston 20 extension shown in FIG. 1, produces a flow device arrangement such that hydraulic venting is permitted by the flow device. As the piston 20 extends out of the bore 40a as shown in FIG. 2, the spring force balance becomes such that the outer flow device, identified as movable member 14, becomes biased away from the inner flow device, identified as fixed member 12, thus closing the flow venting ports and preventing flow communication between the inner and outer flow devices, identified as the fixed and movable members 12, 14. Fluid can also flow in a clearance defined between the piston 20 and bore 40a and through a tuned flow path at the mating surface between 26 and 24. The tensioner body 40 can include an inlet port 40c associated with a check valve 42. The described configuration results in a hydraulic chain tensioner 10 with increased damping capacity.

Figure 4:
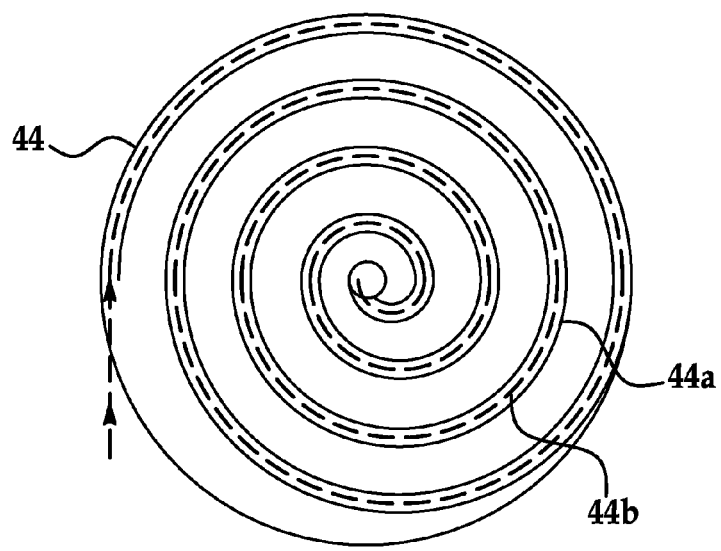
FIG. 4 is a plan view of a disk providing a tortuous flow path for fluid flow in the variable stiffness tension adjuster.

Referring briefly to FIGS. 1-2 and 4, a tortuous path disk 44 is provided in the variable flow hydraulic tensioner 10. The tortuous path disk 44 defines a tortuous fluid path 44a at the mating surfaces between vent disk 26 and surface 24. The tortuous fluid path 44a can define a tuned fluid flow 44b through the variable flow hydraulic tensioner 10. The tortuous path disk 44 provides for refinement in tuning the hydraulic tensioner 10, such that fluid flow out the piston nose is further restricted at a specified rate corresponding to the path width and height of the tortuous fluid path 44a. It should be recognized that the tortuous path 44a can be integrated into the structure of the vent disk 26.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A variable flow hydraulic tensioner (10) for an endless loop power transmission member (34) comprising:
    a fixed member (12) having at least one fluid flow port (12a) extending therethrough;
    a movable member (14) in sliding engagement with the fixed member (12), the movable member (14) having at least one fluid flow port (14a) extending therethrough and initially aligned with respect to the at least one fluid flow port (12a) of the fixed member (12) to allow flow therethrough;
    a first spring (16) having a first spring force for biasing the movable member (14) in a first direction relative to the fixed member (12) and creating alignment of the at least one fluid flow ports (12a, 14a) of the fixed and movable members (12, 14) with respect to one another to allow flow therethrough; and
    a second spring (18) having a second spring force of smaller value than the first spring force for biasing the movable member (14) in a second direction relative to the fixed member (12), such that as an endless loop power transferring member lengthens, a differential force between the first and second springs (16, 18) diminishes until the movable member (14) moves relative to the fixed member (12) sufficiently to offset the fluid flow ports (12a, 14a) with respect to one another and close the at least one fluid flow ports (12a, 14a) extending through the fixed and movable members (12, 14) to prevent flow therethrough.

2. The variable flow hydraulic tensioner (10) of claim 1 further comprising:
    a body (20) having a stepped bore (22) extending therethrough with an annular shoulder (24) located between a larger diameter bore portion (22a) and a smaller diameter bore portion (22b); and
    the fixed member (12), movable member (14), first spring (16) and second spring (18) located within the larger bore portion (22a).

3. The variable flow hydraulic tensioner (10) of claim 1 further comprising:
    a vent disk (26) having an aperture (28) therethrough; and
    the fixed member (12) seated against the vent disk (26).

4. The variable flow hydraulic tensioner (10) of claim 1 further comprising:
    the fixed member (12) having an annular flange portion (12b) and a hollow cylindrical portion (12c), wherein the second spring (18) is seated against the annular flange portion (12b) of the fixed member (12).

5. The variable flow hydraulic tensioner (10) of claim 1 further comprising:
    the movable member (14) having an annular flange portion (14b) and a hollow cylindrical portion (14c), wherein the first and second springs (16, 18) are seated against opposite sides of the annular flange portion (14b) of the movable member (14).

6. The variable flow hydraulic tensioner (10) of claim 1 further comprising:
    the fixed member (12) having an annular flange portion (12b) and a hollow cylindrical portion (12c), wherein the second spring (18) is seated against the annular flange portion (12b) of the fixed member (12); and
    the movable member (14) having an annular flange portion (14b) and a hollow cylindrical portion (14c), wherein the hollow cylindrical portion (14c) of the movable member (14) telescopically engaged with the hollow cylindrical portion (12c) of the fixed member (12), the first and second springs (16, 18) seated against opposite sides of the annular flange portion (14b) of the movable member (14).

7. A variable flow hydraulic tensioner (10) for an endless loop power transmission member (34) comprising:
 a body (20) having a stepped bore (22) extending therethrough with an annular shoulder (24) located between a larger diameter bore portion (22a) and a smaller diameter bore portion (22b);
 a fixed member (12) located within the larger bore portion (22a) and supported by the annular shoulder, the fixed member (12) having at least one fluid flow port (12a) located extending radially therethrough;
 a movable member (14) located within the larger bore portion (22a) and in sliding engagement with the fixed member (12), the movable member (14) having at least one fluid flow port (14a) located extending radially therethrough and initially aligned longitudinally with respect to the at least one fluid flow port (12a) of the fixed member (12) to allow flow therethrough;
 a first spring (16) having a first spring force and located within the larger bore portion (22a) for biasing the movable member (14) toward the fixed member (12) for aligning the at least one fluid flow ports (12a, 14a) of the fixed and movable members (12, 14) longitudinally with respect to one another to allow flow therethrough; and
 a second spring (18) having a second spring force of smaller value than the first spring force located within the larger bore portion (22a) for biasing the movable member (14) longitudinally away from the fixed member (12), such that as the endless loop power transmission member lengthens, a differential spring force between the first and second springs (16, 18) diminishes until the movable member (14) moves longitudinally away from the fixed member (12) sufficiently to offset the radially extending fluid flow ports (12a, 14a) with respect to one another and close the at least one fluid flow ports (12a, 14a) extending radially through the fixed and movable members (12, 14) to prevent flow therethrough.

8. The variable flow hydraulic tensioner (10) of claim 7 further comprising:
 a vent disk (26) located within the larger bore portion (22a) and seated against the annular shoulder (24); and
 the fixed member (12) seated against the vent disk (26).

9. The variable flow hydraulic tensioner (10) of claim 7 further comprising:
 the fixed member (12) having an annular flange portion (12b) and a hollow cylindrical portion (12c), wherein the second spring (18) is seated against the annular flange portion (12b) of the fixed member (12).

10. The variable flow hydraulic tensioner (10) of claim 7 further comprising:
 the movable member (14) having an annular flange portion (14b) and a hollow cylindrical portion (14c), wherein the first and second springs (16, 18) are seated against opposite sides of the annular flange portion (14b) of the movable member (14).

11. The variable flow hydraulic tensioner (10) of claim 7 further comprising:
 the fixed member (12) having an annular flange portion (12b) and a hollow cylindrical portion (12c), wherein the second spring (18) is seated against the annular flange portion (12b) of the fixed member (12); and
 the movable member (14) having an annular flange portion (14b) and a hollow cylindrical portion (14c), wherein the hollow cylindrical portion (14c) of the movable member (14) telescopically engaged with the hollow cylindrical portion (12c) of the fixed member (12), the first and second springs (16, 18) seated against opposite sides of the annular flange portion (14b) of the movable member (14).

12. In an endless loop power transmission system (30), where a rotatable power input member (32) is in driving contact with an endless loop power transferring member (34) for advancing the endless loop power transferring member (34) along an endless loop path of travel and a rotatable power output member (36) is engaged with the endless loop power transferring member (34) at a position along the endless loop path of travel to be driven by the endless loop power transferring member (34) in order to supply power for driving a load, and a load responsive tension adjuster (10) for adjusting tension of the endless loop power transferring member (34), wherein force for actuating the tension adjuster (10) is derived from exertion of force on a fluid, the improvement of the load responsive tension adjuster (10) comprising:
 a fixed member (12) having a first port (12a);
 a movable member (14) in sliding engagement with the fixed member (12), the movable member (14) having a second port (14a) initially aligned with respect to the first port (12a) to allow fluid flow therethrough;
 a first spring (16) for biasing the movable member (14) toward the fixed member (12) to align the first and second ports (12a, 14a) with respect to one another and allow fluid flow therethrough; and
 a second spring (18) having less spring force than the first spring (16) to bias the movable member (14) away from the fixed member (12), such that as the endless loop power transferring member lengthens, a differential force between the first spring (16) and the second spring (18) diminishes until the movable member (14) moves relative to the fixed member (12) sufficiently to offset the first and second ports (12a, 14a) with respect to one another to prevent fluid flow therethrough.

13. The improvement of the load responsive tension adjuster (10) of claim 12 further comprising:
 the fixed member (12) having an annular flange portion (12b) and a hollow cylindrical portion (12c), wherein the second spring (18) is seated against the annular flange portion (12b) of the fixed member (12).

14. The improvement of the load responsive tension adjuster (10) of claim 12 further comprising:
 the movable member (14) having an annular flange portion (14b) and a hollow cylindrical portion (14c), wherein the first and second springs (16, 18) are seated against opposite sides of the annular flange portion (14b) of the movable member (14).

15. The improvement of the load responsive tension adjuster (10) of claim 12 further comprising:
 the fixed member (12) having an annular flange portion (12b) and a hollow cylindrical portion (12c), wherein the second spring (18) is seated against the annular flange portion (12b) of the fixed member (12); and
 the movable member (14) having an annular flange portion (14b) and a hollow cylindrical portion (14c), wherein the hollow cylindrical portion (14c) of the movable member (14) telescopically engaged with the hollow cylindrical portion (12c) of the fixed member (12), the first and second springs (16, 18) seated against opposite sides of the annular flange portion (14b) of the movable member (14).

* * * * *